United States Patent Office 2,799,689
Patented July 16, 1957

2,799,689

SYNTHESIS OF 15 OXYGENATED STEROIDS

Josef Fried, New Brunswick, N. J., assignor to Olin Mathieson Chemical Corporation, New York, N. Y., a corporation of Virginia No Drawing. Application May 27, 1955,
Serial No. 511,785

14 Claims. (Cl. 260—397.3)

This invention relates to the synthesis of valuable steroids.

One object of this invention is the provision of an advantageous process of preparing 15-oxygenated steroids of the 3,20-diketo-pregnane (including the allopregnane and 14-iso-17-isopregnane) series.

Another object of this invention is the provision of steroids of the 3,20-diketo-pregnane (including the allopregnane and 14-iso-17-isopregnane) series, oxygenated in the 15-position, which compounds are useful for their own physiological action.

The new steroids of this invention comprise: (a) 15-hydroxy-pregnane-3,20-dione; (b) 15-hydroxyallopregnane-3,20-dione; (c) pregnane-3,15,20-trione; (d) allopregnane-3,15,20-trione; and (e) allo-14-iso-17-isopregnane-3,15,20-trione.

The new 15-hydroxypregnane-3,20-dione and 15-hydroxyallopregnane-3,20-dione steroids of this invention may be prepared by a process essentially comprising catalytically hydrogenating a 15-hydroxyprogesterone. The allopregnane-3,15,20-trione can be similarly prepared by catalytically hydrogenating 15-ketoprogesterone or by the oxidation of 15α- or 15β-hydroxyallopregnane-3,20-dione. Pregnane-3,15,20-trione can be prepared by the oxidation of 15α- or 15β-hydroxypregnane-3,20-dione. To prepare allo-14-iso-17-isopregnane-3,15,20-trione, allopregnane-3,15,20-trione is treated with a basic reagent. The 15-hydroxyprogesterone and 15-ketoprogesterone steroids useful as starting materials in the processes of this invention can be prepared by the methods disclosed by Josef Fried et al. in their Patent No. 2,753,290, granted July 3, 1956, and applications Serial Nos. 511,781 and 511,782, filed on even date herewith.

To prepare the 15-hydroxypregnane-3,20-dione, 15-hydroxyallopregnane - 3,20 - dione and allopregnane-3,15,20-trione derivatives of this invention, 15-hydroxyprogesterone (wherein the hydroxy group is in either the alpha or beta position) or 15-ketoprogesterone is catalytically hydrogenated by treatment with at least one mole of hydrogen per mole of steroid. Suitable hydrogenation catalysts utilizable in effecting this reaction are platinum, Raney nickel, and palladium, although any other known hydrogenation catalyst may be employed. This reaction results in a mixture of 15-hydroxypregnane-3,20-dione and 15-hydroxyallopregnane-3,20-dione (which can be separated by the procedure in Example 1), if a 15-hydroxyprogesterone is used as the initial reactant, and primarily allopregnane-3,15,20-trione if 15-ketoprogesterone is used as the initial reactant. Pregnane-3,15,20-trione can be prepared by the oxidation of 15-hydroxypregnane-3,20-dione. To effect this oxidation, the 15-hydroxy steroid is treated with an oxidizing agent such as a hexavalent chromium (chromic) ion, e. g., chromic oxide, preferably in an organic acid medium (e. g. glacial acetic acid). This oxidation procedure also affords an alternative route for the preparation of allopregnane-3,15,20-trione from 15-hydroxyallopregnane-3,20-dione. The 15-hydroxypregnane-3,20-diones and 15-hydroxyallopregnane-3,20-diones are new steroids which are active as myotrophic or proteinanabolic agents. The pregnane-3,15,20-trione, allopregnane-3,15,20-trione, and allo-14-iso-17-isopregnane-3,15,20-trione derivatives are new steroids which are utilizable as androgenic agents.

The following examples are illustrative of the invention (all temperatures being in centigrade):

EXAMPLE 1

*Catalytic hydrogenation of 15β-hydroxyprogesterone to 15β-hydroxypregnane-3,20-dione and 15β-hydroxyallopregnane-3,20-dione*

To a suspension of 100 mg. of 5% palladium on barium sulfate catalyst in 2 ml. of ethyl acetate is added a solution of 100 mg. of 15β-hydroxyprogesterone in 7 ml. of ethyl acetate. Hydrogen uptake is rapid and is complete within 17 min. The total uptake of 8.8 cc. of hydrogen corresponds to 1.16 moles/mole of substrate. The catalyst is centrifuged off and washed several times with chloroform. The combined ethyl acetate-chloroform solution is evaporated to dryness in vacuo and separated by fractional crystallization from acetone into 15β-hydroxyallopregnane-3,20-dione and 15β-hydroxypregnane-3,20-dione. The more insoluble allo-compound separates first and has the following properties: M. P. about 256–258°, $[\alpha]_D^{23}+93°$ (c., 0.57 in chloroform). From the acetone mother liquor 15β-hydroxypregnane-dione is obtained, M. P. about 216–218°.

By substituting 100 mg. of 15α-hydroxyprogesterone for the 15β-hydroxyprogesterone in Example 1, and following the same procedure, a mixture of 15α-hydroxyallopregnane-3,20-dione and 15α-hydroxypregnane-3,20-dione is produced, which mixture can be separated according to the procedure of this example.

EXAMPLE 2

*Catalytic hydrogenation of 15-ketoprogesterone to allopregnane-3,15,20-trione*

A solution of 41.4 mg. of 15-ketoprogesterone in 5 ml. of ethyl acetate is added to a suspension of 44 mg. of 5% palladium on barium sulfate catalyst in 2 ml. of ethyl acetate, which has been pre-reduced with hydrogen at atmospheric pressure. Uptake of hydrogen by the substrate is rapid and comes to a standstill after 35 minutes, when 4.3 ml. of hydrogen equal to 1.3 moles/mole of substrate has been absorbed. After centrifugation of the catalyst and removal of the solvent, the crystalline residue consisting of allopregnane-3,15,20-trione is recrystallized from 95% alcohol. The pure substance has the following properties: M. P. about 220–221°; $[\alpha]_D^{23}+137°$ (c., 0.58 in CHCl₃) +130° (c., 0.50 in methanol);

$\lambda_{max}^{Nujol}$ 5.75μ (15-keto), 5.82μ, 5.85μ (3- and 20-keto)

*Analysis.*—Calcd. for C₂₁H₃₀O₃(330.45): C, 76.32; H, 9.15. C, 76.76; H, 8.93.

EXAMPLE 3

*Oxidation of 15β-hydroxypregnane-3,20-dione to pregnane-3,15,20-trione*

To a solution of 25 mg. of 15β-hydroxypregnane-3,20-dione in 3 ml. of glacial acetic acid is added over a period of ten minutes a solution of 7.5 mg. of CrO₃ in 3 ml. of glacial acetic acid. The excess chromic acid is destroyed by the addition of 0.5 ml. of alcohol and the mixture concentrated to small volume in vacuo. The residue is taken up in chloroform and the chloroform solution extracted with water, dilute sodium bicarbonate and again with water. Evaporation of the solvent in vacuo leaves pregnane-3,15,20-trione as a residue, which after crystallization from 95% ethanol melts at about 167–169° C.

Similarly 15α-hydroxypregnane-3,20-dione yields pregnane-3,15,20-trione upon oxidation in accordance with the procedure of this example.

EXAMPLE 4

*Oxidation of 15β-hydroxyallopregnane-3,20-dione to allopregnane-3,15,20-trione*

25 mg. of 15β-hydroxyallopregnane-3,20-dione is oxidized with 7.5 mg. of chromic acid as described in Example 3. The resulting product after recrystallization from 95% alcohol is identical with allopregnane-3,15,20-trione.

Similarly, 15α - hydroxyallopregnane-3,20-dione yields allopregnane-3,15,20-trione upon oxidation in accordance with the procedure of this example.

EXAMPLE 5

*Isomerization of allopregnane-3,15,20-trione to allo-14-iso-17-iso-pregnane-3,15,20-trione*

A solution of 10 mg. of allopregnane-3,15,20-trione in 2 ml. of of 0.02 N KOH in methanol is allowed to stand at room temperature for 20 hours. During this period of time the specific rotation changes from +130° to +53°. Acidification of the equilibrated solution with one drop of acetic acid followed by evaporation of the solvent furnishes a residue, which is extracted with chloroform and washed with water. Evaporation of the chloroform affords crystals, which on recrystallization from acetone-hexane give pure allo-14-iso-17-isopregnane-3,15,20-trione, M. P. about 186–189°; $[\alpha]_D^{23}$ +60° (c., 0.56 in CHCl$_3$);

$\lambda_{max.}^{Nujol}$ 5.76μ, (15-keto), 5.85μ (3- and 20-keto)

*Analysis.*—Calcd. for C$_{21}$H$_{30}$O$_3$ (330.45): C, 76.32; H, 9.15. Found: C, 76.32; H, 8.91.

Allo-14-iso-17-isopregnane-3,15,20-trione can also be termed allo-14β,17α-pregnane-3,15,20-trione and can be represented by the formula

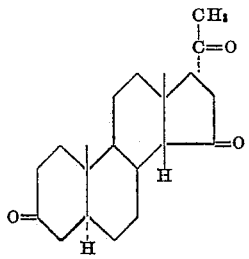

This invention may be variously otherwise embodied within the scope of the appended claims.

I claim:
1. A steroid selected from the group consisting of: 15-hydroxypregnane - 3,20-dione; 15-hydroxyallopregnane-3,20 - dione; pregnane-3,15,20-trione; allopregnane-3,15,20-trione; and allo-14-iso-17-isopregnane-3,15,20-trione.
2. 15-hydroxypregnane-3,20-dione.
3. 15-hydroxyallopregnane-3,20-dione.
4. Pregnane-3,15,20-trione.
5. Allopregnane-3,15,20-trione.
6. Allo-14-iso-17-isopregnane-3,15,20-trione.
7. The process for preparing a steroid of the 3.20-diketopregnane series having in the 15-position a substituent selected from the group consisting of hydroxy and keto; which comprises reacting a steroid selected from the group consisting of 15-hydroxyprogesterone and 15-ketoprogesterone with hydrogen in the presence of a hydrogenation catalyst of the group consisting of platinum, Raney nickel and palladium, and recovering the desired steroid.
8. The process for preparing a steroid selected from the group consisting of 15-hydroxypregnane-3,20-dione and 15-hydroxyallopregnane-3,20-dione, which comprises reacting a 15-hydroxyprogesterone with hydrogen in the presence of a hydrogenation catalyst of the group consisting of platinum, Raney nickel and palladium, and recovering the desired steroid.
9. The process for preparing allopregnane-3,15,20-trione which comprises reacting 15-ketoprogesterone with hydrogen in the presence of a hydrogenation catalyst of the group consisting of platinum, Raney nickel and palladium, and recovering the steroid thus produced.
10. The process for preparing allopregnane-3,15,20-trione, which comprises reacting a 15-hydroxyallopregnane-3,20-dione with a hexavalent chromium compound and recovering the 15-keto derivative thus formed.
11. The process for preparing pregnane-3,15,20-trione, which comprises reacting a 15-hydroxypregnane-3,20-dione with a hexavalent chromium compound and recovering the 15-keto derivative thus formed.
12. The process for preparing allo-14-iso-17-isopregnane-3,15,20-trione, which comprises reacting allopregnane-3,15,20-trione with potassium hydroxide, and recovering the isomeric derivative thus formed.
13. The process of claim 12 wherein the reaction is carried out in an organic solvent.
14. The process of claim 12 wherein the reaction is carried out in a lower alkanol solvent.

No references cited.